I. C. MILLER & D. F. HOTT.
WATER CLOSET.
APPLICATION FILED FEB. 9, 1907.

1,001,973.

Patented Aug. 29, 1911.

UNITED STATES PATENT OFFICE.

ISAAC C. MILLER AND DAVID F. HOTT, OF CINCINNATI, OHIO.

WATER-CLOSET.

1,001,973.  Specification of Letters Patent.  Patented Aug. 29, 1911.

Application filed February 9, 1907. Serial No. 356,619.

*To all whom it may concern:*

Be it known that we, ISAAC C. MILLER and DAVID F. HOTT, citizens of the United States, residing at Cincinnati, in the county of Hamilton and State of Ohio, have invented certain new and useful Improvements in Water-Closets, of which the following is a specification.

This invention relates to water closets of the flushing type, and has for its object to provide means whereby the overflowing of the bowl will be prevented if the ordinary channel is stopped up; to prevent water which is left in the bowl from freezing, where the closet is used out-of-doors, by providing a waste in the bottom of the bowl in addition to the ordinary channel; and also to provide means for keeping the traps at all times sealed with fresh water. To these ends, in addition to the ordinary main trap forming the regular channel for the flushing water, we tap the bowl with a supplemental trap delivering into the main trap, and also provide for a supplemental flow of fresh water from the flushing tank, or elsewhere, through suitable pipes to the supplemental trap, main trap, and bowl.

The elements, combinations, and arrangements constituting our invention will be more particularly set forth in the following specification, and defined in the appended claim.

Figure 1:
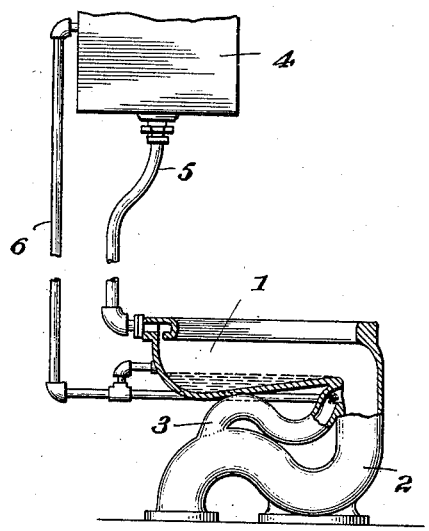
Figure 2:
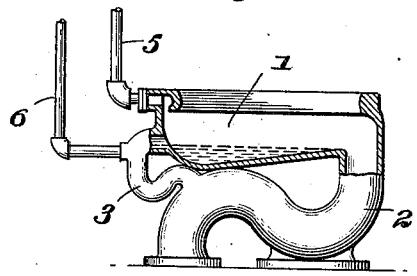

In the accompanying drawings, which are to be taken as a part of this specification, Figure 1 is an elevation, partly in section of a water closet bowl and connected flushing tank, embodying our invention, the pipes leading from the flushing tank being broken away. Fig. 2 is a similar view, showing a modified form of application of our invention, the flushing tank not being shown.

Referring to the numerals on the drawings, 1 indicates a water closet bowl of any ordinary or preferred construction, having the usual main trap 2 leading therefrom. A second or supplemental trap 3 is provided, also tapping the bowl and leading into the main trap. It will be seen that if for any reason the outlet of the bowl into the main trap becomes clogged, there is still an outlet into the supplemental trap, and thence into another part of the main trap. In the drawings we have shown the supplemental trap occupying different relative positions with respect to the bowl and main trap, but it should be understood that these differences of construction are immaterial, and do not affect the spirit of the invention.

4 indicates a flushing tank, from which a pipe 5 leads into the bowl. We prefer to employ also an overflow pipe 6 from the tank leading through one or more openings into the bowl or supplemental trap, or both, constituting a supplemental means for keeping the traps always sealed with fresh water, and insuring thorough flushing of the parts under all conditions.

It is thought that the operation of the device is clear from the foregoing specification, in view of the fact that it is addressed to those skilled in the art.

What we claim is:—

In a water closet, a bowl, a main trap, a supplementary trap, a flushing tank, a connection between said flushing tank and said bowl, a pipe leading from said flushing tank and connecting with said bowl and with the supplementary trap.

In testimony whereof we affix our signatures in presence of two witnesses.

ISAAC C. MILLER.
DAVID F. HOTT.

Witnesses:
JOHN J. FASSER,
M. J. FORMAN.

---

Copies of this patent may be obtained for five cents each, by addressing the "Commissioner of Patents, Washington, D. C."